US011570382B2

(12) United States Patent
Yan

(10) Patent No.: US 11,570,382 B2
(45) Date of Patent: Jan. 31, 2023

(54) IMAGE SENSOR BRIDGE INTERFACE

(71) Applicant: NCR Corporation, Atlanta, GA (US)

(72) Inventor: Jifei Yan, Dundee (GB)

(73) Assignee: NCR Corporation, Atlanta, GA (US)

( * ) Notice: Subject to any disclaimer, the term of this patent is extended or adjusted under 35 U.S.C. 154(b) by 181 days.

(21) Appl. No.: 17/078,192

(22) Filed: Oct. 23, 2020

(65) Prior Publication Data
US 2022/0132075 A1    Apr. 28, 2022

(51) Int. Cl.
| H04N 5/33 | (2006.01) |
| H04N 7/18 | (2006.01) |
| H04N 7/087 | (2006.01) |
| H04N 7/084 | (2006.01) |
| H04N 7/08 | (2006.01) |
| H04N 7/085 | (2006.01) |
| H04N 7/083 | (2006.01) |
| H04N 7/088 | (2006.01) |
| H04N 11/10 | (2006.01) |

(52) U.S. Cl.
CPC ............. *H04N 5/332* (2013.01); *H04N 7/083* (2013.01); *H04N 7/084* (2013.01); *H04N 7/085* (2013.01); *H04N 7/0806* (2013.01); *H04N 7/087* (2013.01); *H04N 7/088* (2013.01); *H04N 7/0855* (2013.01); *H04N 7/0881* (2013.01); *H04N 7/183* (2013.01); *H04N 11/10* (2013.01)

(58) Field of Classification Search
CPC .......... H04N 5/332; H04N 7/083; H04N 7/08; H04N 7/0806; H04N 7/084; H04N 7/085; H04N 7/087; H04N 7/088; H01L 31/09; H01L 31/101
See application file for complete search history.

(56) References Cited

U.S. PATENT DOCUMENTS

| 2009/0059046 A1* | 3/2009 | Hasegawa | H04N 5/2354 348/E5.091 |
| 2020/0014855 A1* | 1/2020 | Blanquart | A61B 1/05 |
| 2020/0036944 A1* | 1/2020 | Zhu | H04N 7/0806 |
| 2021/0082085 A1* | 3/2021 | Stimm | G06T 3/0062 |

FOREIGN PATENT DOCUMENTS

JP        H01-264146 A    * 10/1989    ........... H01J 29/89

* cited by examiner

*Primary Examiner* — David N Werner
(74) *Attorney, Agent, or Firm* — Schwegman, Lundberg & Woessner

(57) ABSTRACT

An image sensor bridge interface is provided. The interface is situated between an image sensor and a processor. The interface comprises an integrated circuit. The integrated circuit comprises a Field-Programmable Gate Array (FPGA) decoupled from both image signals provided from the image sensor and a processor connected to the integrated circuit. The FPGA separates Ultraviolet (UV) and Infrared (IR) data values from image sensor-provided image data and embeds the UV and IR data values within the horizontal blanking, vertical blanking, and/or active video components of a video feed. The video feed provided from the integrated circuit to the processor using a standard video interface, and the processor providing the video feed or providing UV images, IR images, and Red, Green, and Blue (RGB) images separated from the video feed to a computing core of a host device.

13 Claims, 4 Drawing Sheets

IMAGE SENSOR BRIDGE INTERFACE

BACKGROUND

Image capturing is one of the fundamental functions of media handling devices (e.g., Automated Teller Machines (ATMs), Self-Service Terminals (SSTs), kiosks, etc.). Image sensors capture images in analogue format, which are then converted to digital formats and made available for further downstream processing on the media handling devices. Typically, because media handling devices need to evaluate image data provided as output from the image sensors in Ultraviolet (UV) and Infrared (IR) values in addition to standard Red, Green, and Blue (RGB) values (or standard YUV values), media handling devices require customized Field-Programmable Gate Arrays (FPGAs).

A customized FPGA is provided on an integrated circuit board that sits between an image sensor and a Central Processing Units (CPU) of the media handling device. This serves as a bridge, which allows the CPU to evaluate the image data associated with RGB values (or YUV values) and also evaluate the image data for UV and IR values. However, this customization also makes the architecture of a media handling device non-portable and specific to each type media handling device.

As a result, if a different processor is desired for an integrated circuit of a customized FPGA to improve processor throughput, the FPGA's logic has to be updated to accommodate UV and IR values from the image data provided by the image sensor. The customized FPGAs have to be modified when improved processors are desired. Furthermore, the media handling device vendors do not control manufacture of the image sensors (manufactured independently from media handling device).

Typically, processor manufacturers only provide non-standard input and output interfaces for processors that provide UR and IR image values with customized FPGAs, this makes the FPGAs dependent on the processors that support handling UR and IR image values. Consequently, media handling device vendors continue to produce customized FPGAs on customized integrated circuit boards requiring processors with non-standard interfaces. These FPGAs are therefore not usable between different types of media handling devices and require processors with non-standard interfaces, such that the manufacturer-supplied processors for the FPGAs cannot be swapped out or upgraded.

SUMMARY

In various embodiments, a method, a system, and an integrated circuit for image sensor bridge interfaces are presented.

According to an aspect, a method for an image sensor bridge interface is presented. For example, image signals are obtained from an image sensor. Ultraviolet (UV) and Infrared (IR) image data are obtained from select image signals. The UV and IR image data are embedded in a video feed that comprises Red, Green, and Blue (RGB) image data associated with the image signals. The video feed with the UV and IR image data and the RGB image data are provided to a computing core of a host device using a video interface.

DETAILED DESCRIPTION

Figure 1A:
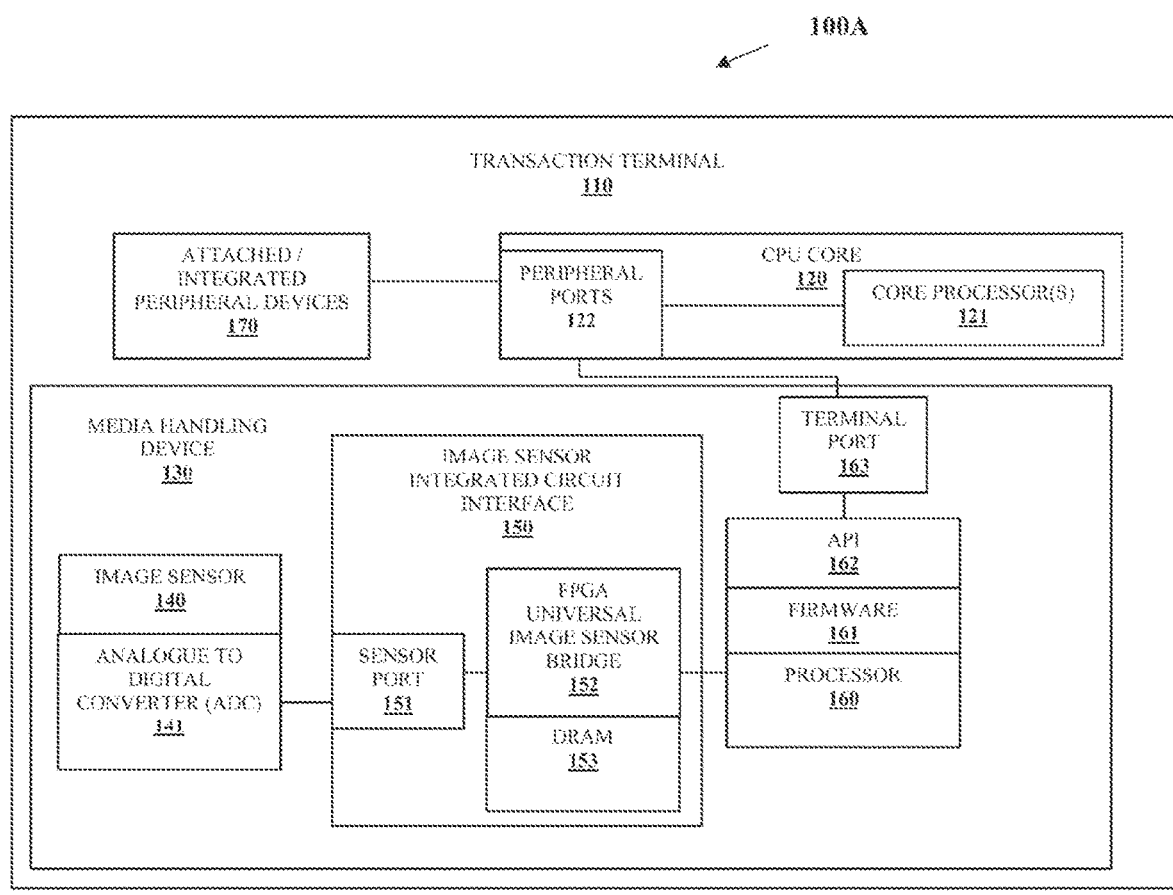
FIG. 1A is a diagram of a system for a transaction terminal comprising a media handling device having an image sensor bridge interface, according to an example embodiment.

FIG. 1A is a diagram of a system 100A fora transaction terminal 110 comprising a media handling device 130 having an image sensor bridge interface 150, according to an example embodiment. It is to be noted that the components are shown schematically in greatly simplified form, with only those components relevant to understanding of the embodiments being illustrated.

Furthermore, the various components (that are identified in the FIGS. 1A-1C) are illustrated and the arrangement of the components is presented for purposes of illustration only. It is to be noted that other arrangements with more or less components are possible without departing from the teachings of bridging interfaces between an image sensor device 120 and a host device (such as media handling device 110) presented herein and below.

As will be described in greater detail herein and below, an integrated circuit 150 is provided as a bridge interface (integrated circuit 150 may also be referred to as bridge interface 150 herein) between an image sensor 140 and a CPU 121 of a host device (transaction terminal 110 in FIG. 1A). The circuit 150 comprises a FPGA 152 that decouples the image signals received from the image sensor 140 and a general purpose processor 160 of a media handling device 130 by removing UV and IR data signals from the image signals and embedding the UV and IR data signals within the horizontal blanking, vertical blanking, and/or active video components of a video feed. The video feed with the embedded UV and IR data is provided by the circuit 150 to the processor 160 of the integrated circuit 150 over a video interface. The processor 160 of the media handling device 130 then provides the video feed to the host device's CPU 121 for downstream processing of both the RGB (or YUV) image data and the UV and IR data. This provides a universal image sensor bridge 150 that connects the image sensor 140 to the CPU 121 of the host device 110 and allows the processor 160 of the media handling device 130 to be decoupled (not dependent on the UV and IR data signals) allowing the valuable media handling device's processor 160 to be replaced, swapped out, upgraded, and enhanced without impacting the UV and IR data downstream processing by the CPU 121 of the host device 110 and without requiring changes to the FPGA 152 of the circuit 150. Moreover, a standard video interface between the integrated circuit 150 and the media handling device's processor 160 is used, such that the circuit 150 is not dependent on processor 160 and usage of non-standard interface to support providing UV and IR image data to the CPU 121 of the host device 110.

System 100A comprises a transaction terminal 110, a valuable media handling device 110, and other attached and integrated peripheral devices 170 of terminal 110. Transaction terminal 110 comprises CPU core 120, an attached media handling peripheral device 130, and other attached/integrated peripheral devices 170, The media handling device 130 comprises an image sensor 140, an image sensor integrated circuit 150 (may also be referred to herein as "bridge 150," "bridge interface 150," and/or "interface 150"), a general purpose processor 160, firmware 161, an Application Programming Interface (API) 162, and terminal port 163.

CPU core 120 comprises one or more core processors 121 and a plurality of peripheral ports 122.

In an embodiment, image sensor 140 comprises an Analogue to Digital Converter (ADC) 141 (as illustrated in FIG. 1A).

In an embodiment, image sensor 140 provides analogue output and lacks ADC 141. In this embodiment, an ADC 141 is provided within integrated circuit 150 to translate the analogue data format to digital format before being passed through FPGA 152.

Bride interface 150 comprises a sensor port 151, a FPGA 152, and a Dynamic Random-Access Memory 153 (DRAM 153—optional).

Media handling device 130 also comprises a general-purpose processor 160, firmware 161, an API 162, and a terminal port 163.

Typically, an image sensor 140 is an analog component. When connected to a digital system/component, an ADC 141 is processed.

Accordingly, in an embodiment, an external ADC 141 may be a separate interface between image sensor 140 and bridge interface 150, or as discussed above ADC 141 may be part of bridge interface 150 (in such embodiments ADC 141 may connected to the right or after sensor port 151 in FIG. 1A).

However, modern image sensors 140 normally have integrated ADCs 141, which effectively convert these sensors into "digital" image sensors. Most of these digital image sensors 141 use high speed serial data cabling to transmit image/video data/signals.

In an embodiment, ADC 141 is connected to sensor port 151 using a Low-Voltage Differential Signaling (LVDS) cable to a compatible LVDS sensor port 151 of bridge interface 150.

In an embodiment, ADC 141 is connected to sensor port 151 using a MIPI CSI-2 cable to a compatible sensor port 151 of bridge interface 150.

In an embodiment, sensor port 141 supports a 7:1 serial data link with a variety of data lanes and format configurations.

As mentioned above, media handling devices require UV and IR data values from images for purpose of performing a variety of downstream processing by software executed by core processors 121 of CPU core 120 of terminal 110. This downstream processing is needed for valuable media validation, counterfeit detection, and other reasons that are unique to handling currency and bank notes. There exists no market-based integrated circuit that can provide the UV and IR data values using a standard processor interface provided by processor manufacturers of general purposes processors. This is changed with the teachings provided herein as bridge interface 140 embeds the UV and IR data values within the horizontal blanking, vertical blanking, and/or active video components of a video data stream and provides the video feed using a standard video interface to the processor 160 of the media handling device 130.

FPGA 152 receives the image data from ADC 141 over sensor port 151, utilizing custom logic all UV are IR data are separated out from the RGB or YUV data. The UV and IR data is embedded in one of three components of a video stream, which is then provided by processor 160 where it can be further provided to core processors 121 over terminal port 163.

In an embodiment, port 147 is a Universal Serial Bus (USB) port or an Ethernet port.

A standard video interface input format provides the RGB or YUV data of all pixels in an "active video" area or component of the video stream. Separate from the active video area, there are areas or components of the video stream associated with "horizontal blanking" and "vertical blanking;" these areas or components of the video stream do not conventionally carry any image-based data. These components are reserved to transfer user-defined information. Some processors may store information of a blanking area/component in a separate memory location for software to handle.

In an embodiment, FPGA 152 embeds IR and UV data values from the provided image/video stream of image sensor 140 within the horizontal blanking component/area of the video stream. IR and UV data values can be sent almost immediately after received from bridge interface 150 and such an approach reduces memory needs for any image buffer or memory of bridge interface 150. In such embodiment, bridge interface 150 does not require DRAM 153.

In an embodiment, FPGA 152 embeds IR and UV data values from the provided image/video stream of image sensor 140 within the vertical blanking component/area of the video stream. In this case, DRAM 153 is used to store the IR and UV data until a whole frame of image data is received from sensor 140 at which time, the IR and UV data is available from DRAM 153. Here, FPGA 150 sends the IR and UV data after sending the active video data to processor 160.

An advantage of using the blanking areas/components of the video stream to store and provide the IR and UV data values is that the blanking areas do not go through a processor's image processing chain. So, only upper layer software (executed by processor 160) would only have to be enhanced to obtain and process the IR and UV data values from the blanking areas/components.

In an embodiment, FPGA 152 embeds IR and UV data values within the active video area/component of the video feed. This embodiment may be needed when the blanking areas are ignored by processor 160 during image processing. Using this embodiment, IR and UV data values are sent within the active video areas/components. The processor 160 and related image processing are modified to ensure the IR and UV data values are stripped from the active video area/component for all image processing that does not use IR or UV data values.

In an embodiment, image sensor 140 comprises a configuration interface to change settings. For example, most sensors provide a configuration interface for I2C and SPI, bridge interface 150 provides an I2C-to-I2C bridge or an I2C-to-SPI bridge for processor 160 to access image sensor internal registers. From the firmware 161 point of view, it is always accessing image sensor settings through I2C, as long as the upper layer API 162 keeps the same; the firmware 161 running on the processor 160 does not need to be recompiled. It can support different image sensors 140 by introducing register description files for each of the different image sensors 140.

Figure 1B:
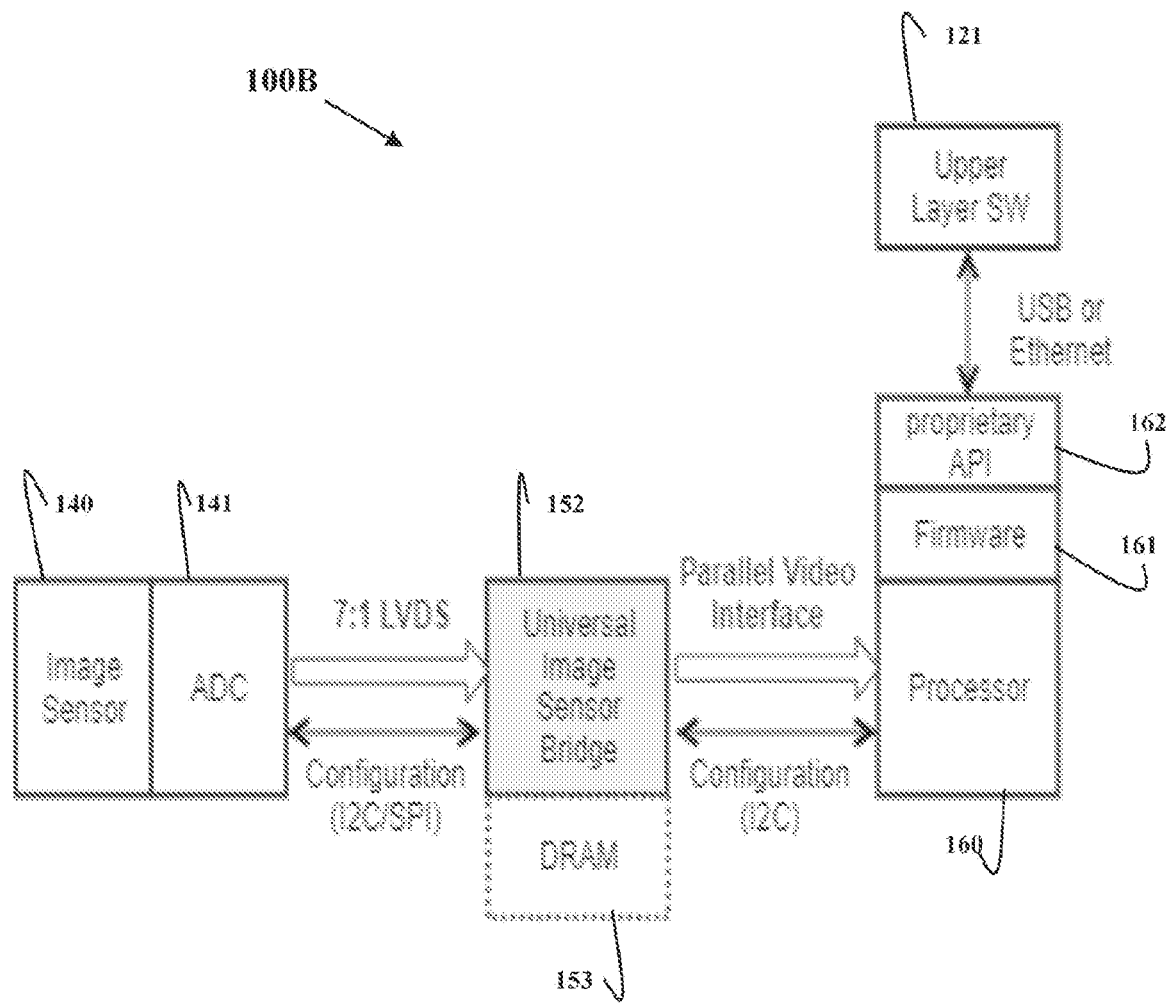
FIG. 1B is a diagram of an integrated circuit for an image sensor bridge interface, according to an example embodiment.

FIG. 1B is a diagram of the integrated circuit for the image sensor bridge interface 150, according to an example embodiment.

The image sensor 140 captures image data signals/values when activated and provides as output when captured to ADC 141. ADC 141 translates the analogue image data signals/values into digital image data signals/values. The digital image data signals/values are provided over a LVDS 7:1 serial data cable to port 151, where FPGA 152 (called universal image sensor bridge in FIG. 1B) obtains. IR and UV image data values are obtained from the digital image data signals/values and embedded in a video interface format within the horizontal blanking area, the vertical blanking area (in which case the signals/values are buffered in DRAM 153), or the active video area. A parallel video interface between FPGA 152 and processor 160 provides the modified video data to processor 160. Any firmware 161 processed on the video feed is processed and the processor-specific API 162 is used to send or to stream the video feed over port 163 to port 122 where downstream processing is performed by upper layer software of core processors 121 on the video feed, which now includes the IR and UV data values.

Figure 1C:
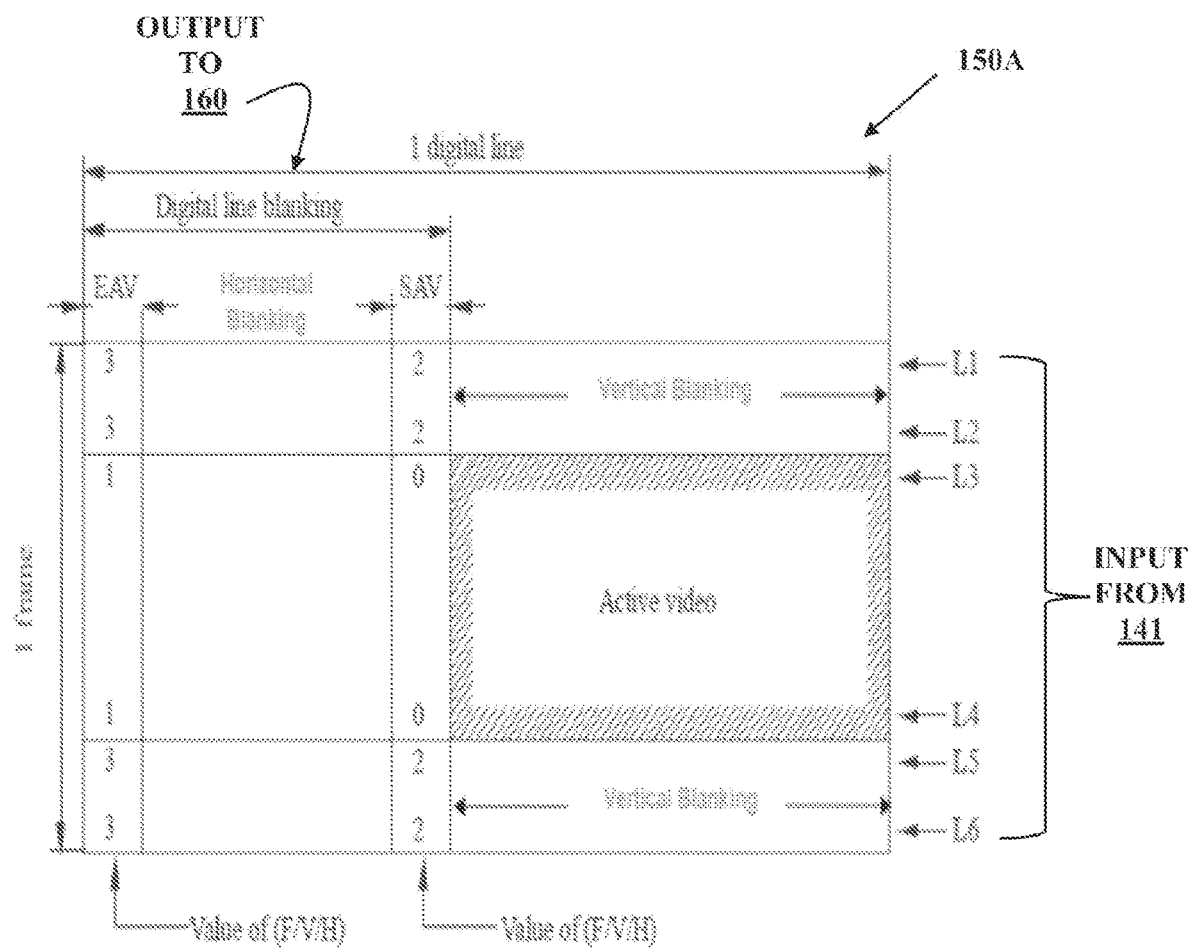
FIG. 1C is a diagram of an image/video data process flow through the image sensor bridge interface of FIG. 1B, according to an example embodiment.

FIG. 1C is a diagram of an image/video data process flow through the image sensor bridge interface 150 of FIG. 1B, according to an example embodiment.

The right-side of FIG. 1C indicates that digital image data values/signals as processed between FPGA 152 and processor 160 once received over a 6-line (L1-L6) LVDS cable from ADC 141 to bridge interface 150. SAV stands for Start Active Value and EAV stands for End Active Value. F/V/H stands for Frame/Vertical Blanking/Horizontal Blanking values, where F is values for the active video area/component, V is values for the vertical blanking area/component, and H is values for the horizontal blanking area/component. Any of the three discussed options can be used where the IR and UV data values are either embedded in the horizontal blanking area, the vertical blanking area, or within the active video area.

In an embodiment, the transaction terminal 110 an ATM, a SST, a Point-Of-Sale (POS) terminal, or a kiosk. The media handling device 130 is one peripheral connected to terminal 110.

In an embodiment, the combination of bridge interface 150 and 160-161 are integrated into any composite device as a bridge between output from an image sensor 140 and input to a host device's processor 121 where IR and UV image data is separated out and provided for processing.

Figure 2:
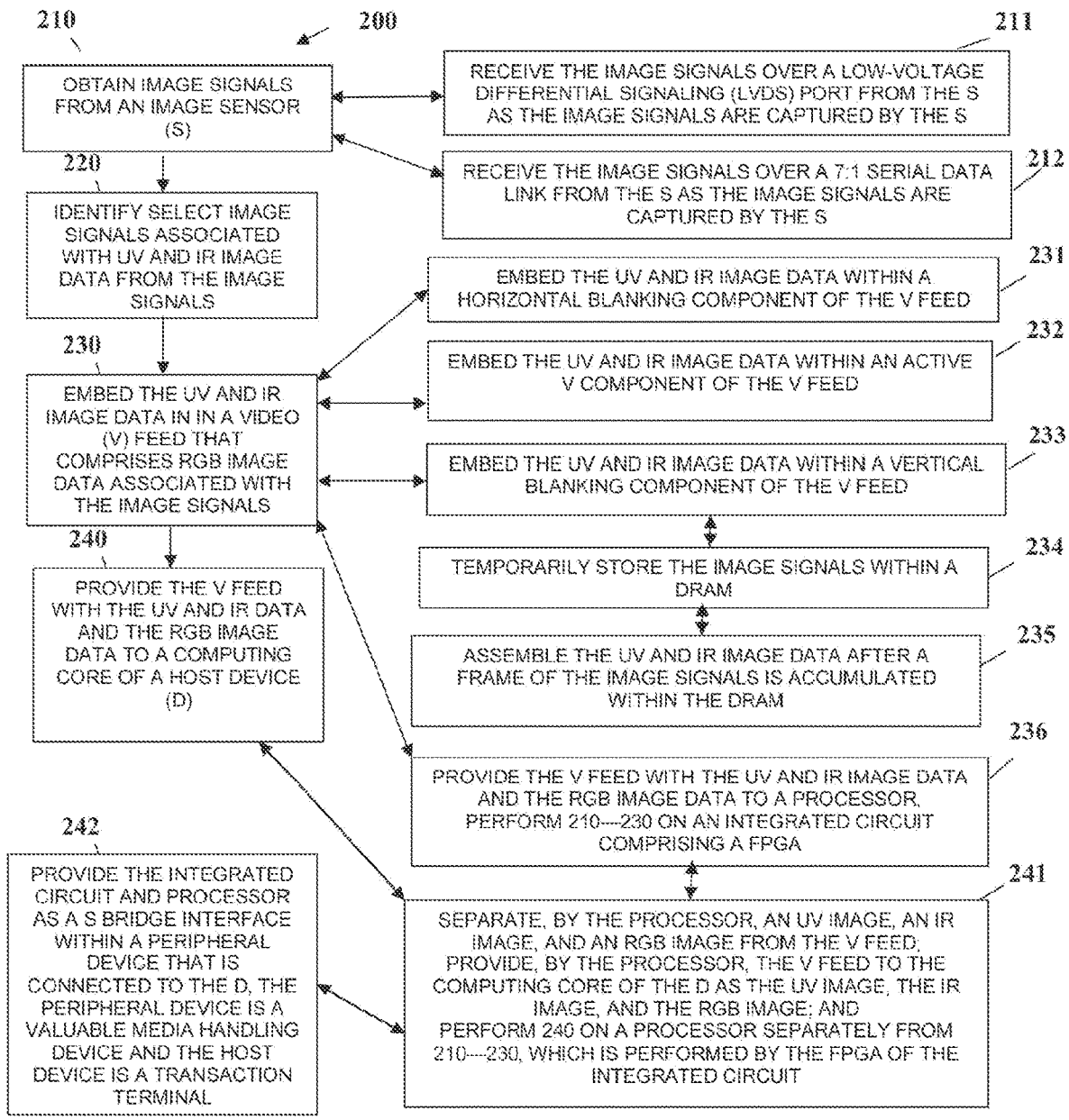
FIG. 2 is a diagram of a method for interfacing an image sensor with a host device, according to an example embodiment.

These and other embodiments are now discussed with FIG. 2.

FIG. 2 is a diagram of a method 200 for interfacing an image sensor with a host device, according to an example embodiment. The components that implement the method 200 are referred to as a "bridge interface."

The bridge interface is provided within integrated circuit 150 and processor 160.

In an embodiment, the integrated circuit 150 is provided within valuable media handling device that is a peripheral device to transaction terminal 110. In an embodiment, the transaction terminal 110 is an ATM, a POS terminal, a SST, or a kiosk.

In an embodiment, the integrated circuit 150 is provided within any computing device that comprises software that utilizes IR and UV image data values provided by an image sensor.

At 210, the bridge interface obtains image signals from an image sensor.

In an embodiment, at 211, the bridge interface receives the image signals over a LVDS port from the image sensor as the image signals are captured by the image sensor.

In an embodiment, at 212, the bridge interface receives the image signals over a 7:1 serial data link from the image sensor as the image signals are captured by the image sensor.

At 220, the bridge interface identifies select image signals associated with UV and IR image data from the image signals.

At 230, the bridge interface embeds the UV and IR image data within or in a video feed that comprises RGB image data associated with the image signals.

In an embodiment, at 231, the bridge interface embeds the UV and IR image data within a horizontal blanking component or area of the video feed.

In an embodiment, at 232, the bridge interface embeds the UV and IR image data within an active video component or area of the video feed.

In an embodiment, at 233, the bridge interface embeds the UV and IR data within a vertical blanking component or area of the video feed.

In an embodiment of 233 and at 234, the bridge interface temporarily store the image signals within a DRAM.

In an embodiment of 234 and at 235, the bridge interface assembles the UV and IR image data after a frame of the image signals is accumulated within the DRAM.

In an embodiment, at 236, the bridge interface provides the video feed with the UV and IR image data and with the RGB image data to a processor. Here, 210-230 (or through 235) is performed on an integrated circuit 150 through FPGA 152.

At 240, the bridge interface provides the video feed with the UV and IR data and with the RGB image data to a computing core of a host device.

In an embodiment of 236 and 240, at 241, the processor separates at least one UV image, at least one IR image, and at least one RGB image from the video feed. The processor provides the video feed to the computing core of the host device as the UV image, the IR image, and the RGB image. Here, the bridge interface performs 240 through the processor separately from 210-230 (or through 235), which is performed by the FPGA 152 of the integrated circuit 150.

In an embodiment of 241 and at 242, the integrated circuit and the processor are provided as a bridge interface within a peripheral device. The peripheral device is a valuable media handling device 130 and the host device is a transaction terminal 110. The peripheral device connected to the host device via a USB or Ethernet connection.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   obtaining image signals from an image sensor;
   identifying select image signals associated with Ultraviolet (UV) and Infrared (IR) image data from the image signals;
   embedding the UV and IR image data in a video feed that comprises Red, Green, and Blue (RGB) image data associated with the image signals, wherein embedding further includes one of:
      embedding the UV and IR image data within a horizontal blanking component of the video feed; and
      embedding further includes embedding the UV and IR image data within a vertical blanking component of the video feed; and
   providing the video feed with the UV and IR image data and the RGB image data to a computing core of a host device.

2. The method of claim 1, wherein obtaining further includes receiving the image signals over a Low-Voltage Differential Signaling (LVDS) port from the image sensor as the image signals are captured by the image sensor.

3. The method of claim 1, wherein obtaining further includes receiving the image signals over a 7:1 serial data link from the image sensor as the image signals are captured by the image sensor.

4. The method of claim 1, wherein embedding further includes temporarily storing the image signals within a dynamic random-access memory.

5. The method of claim 4, wherein temporarily storing further includes assembling the UV and IR image data after a frame of the image signals is accumulated within the dynamic random-access memory.

6. The method of claim 1, wherein embedding further includes providing the video feed with the UV and IR image data and the RGB image data to a processor using a video interface,
   wherein the method is processed on an integrated circuit comprising a Field-Programmable Gate Array (FPGA) that performs the obtaining, the identifying, and the embedding.

7. The method of claim 6, wherein providing the video feed to the computing core of the host device further includes:
   separating, by the processor, at least one UV image, at least one IR image, and at least one RGB from the video feed; and
   providing, by the processor, the video feed to the computing core of the host device as the at least one UV image, the at least one IR image, and the at least one RGB image;
   wherein the processor performs the providing of the video feed to the computing core of the host device separately from the obtaining, the identifying, and the embedding that are performed by FPGA of the integrated circuit.

8. The method of claim 7 further comprising, providing the integrated circuit as an image sensor bridge interface within a peripheral device that is connected to the host device, and
   wherein the peripheral device is a valuable media handling device and
   the host device is a transaction terminal.

9. A system, comprising:
   a host device comprising a computing core; and
   a peripheral device connected to the host device, the peripheral device comprising:
      an image sensor;
      an integrated circuit situated between the image sensor and the computing core of the host device; and
      a processor;
      the integrated circuit comprising a Field-Programmable Gate Array (FPGA);
      the FPGA configured to:
         receive image signals captured by the image sensor;
         identify Ultraviolet (UV) and Infrared (IR) image data from the image signals;
         identify Red, Green, and Blue (RGB) image data from the image signals;
         embed the UV and IR image data within a video feed with the RGB image data; and
         pass the video feed to the processor using a standard video interface;
      the processor configured to:
         receive the video feed from the FPGA; and
         provide the video feed with the RGB image data and with embedded UV and IR image data to the computing core of the host device over a connection to the host device;
      wherein the FPGA performs one of:
         embedding of the UV and IR image data by embedding the UV and IR data within a horizontal blanking component of the video feed; and
         embedding of the UV and IR image data by embedding the UV and IR data within a vertical blanking component of the video feed.

10. The system of claim 9, wherein the host device is a transaction terminal comprising: an Automated Teller Machine (ATM), a Self-Service Terminal (SST), a Point-Of-Sale (POS) terminal, or a kiosk, and
   wherein the peripheral device is a valuable media handling device.

11. The system of claim 9, wherein the processor of the peripheral is decoupled from the FPGA via the standard video interface so as to permit the processor of the peripheral device to be replaced with a different processor without changing and without modifying the FPGA.

12. The system of claim 9, wherein the processor of the peripheral device is further configured to provide the video feed to the computing core of the host device by:
   separating at least one UV image, at least one IR image, and at least one RGB from the video feed; and
   providing the video feed to the computing core of the host device as the at least one UV image, the at least one IR image, and the at least one RGB image.

13. An integrated circuit, comprising:
   an image sensor port to connect to an image sensor;
   a connection to a processor; and
   a Field-Programmable Gate Array (FPGA);
   wherein the FPGA is configured to:
      receive image signals captured by the image sensor over the image sensor port;
      identify Ultraviolet (UV) and Infrared (IR) image data from the image signals;
      identify Red, Green, and Blue (RGB) image data from the image signals;

embed the UV and IR image data within a video feed with the RGB image data; and pass the video feed to the processor using a standard video interface;

wherein the FPGA performs one of:

embedding of the UV and IR image data within a horizontal blanking component of the video feed; and embedding of the UV and IR image data within a vertical blanking component of the video feed; or 3) within an active video component of the video feed.

\* \* \* \* \*